(12) United States Patent
Voss et al.

(10) Patent No.: US 8,012,523 B2
(45) Date of Patent: Sep. 6, 2011

(54) PERMANENT FILTERING POD FOR BREWING BEVERAGES

(76) Inventors: Margaret E. Voss, Thornton, IL (US); Mary A. Puglise, Thornton, IL (US)

( * ) Notice: Subject to any disclaimer, the term of this patent is extended or adjusted under 35 U.S.C. 154(b) by 1202 days.

(21) Appl. No.: 11/345,916

(22) Filed: Feb. 2, 2006

(65) Prior Publication Data

US 2006/0169150 A1 Aug. 3, 2006

Related U.S. Application Data

(60) Provisional application No. 60/649,493, filed on Feb. 3, 2005, provisional application No. 60/649,488, filed on Feb. 3, 2005.

(51) Int. Cl.
B65B 29/02 (2006.01)
A23F 5/00 (2006.01)

(52) U.S. Cl. ............... 426/433; 426/77; 99/323; 99/295

(58) Field of Classification Search ............ 99/295, 99/323, 302 R; 426/77, 433; 220/9.4, 9.2, 220/4.21, 6; 206/260, 266, 258, 815, 37; 232/1 D; 150/150, 151, 52
See application file for complete search history.

(56) References Cited

U.S. PATENT DOCUMENTS

| | | | |
|---|---|---|---|
| 1,282,761 A * | 10/1918 | Combes | 383/43 |
| 1,894,345 A * | 1/1933 | Cooper | 426/394 |
| 2,283,967 A * | 5/1942 | Brown | 99/289 R |
| 2,292,101 A * | 8/1942 | Brown | 426/77 |
| RE24,166 E * | 6/1956 | Stiller | 150/150 |
| 2,905,075 A * | 9/1959 | Liebelt | 99/295 |
| 3,357,340 A | 12/1967 | Berns et al. | |
| 3,539,355 A | 11/1970 | Kasakoff | |
| 3,985,069 A | 10/1976 | Cavalluzzi | |
| 4,069,751 A | 1/1978 | Gronwick et al. | |
| 4,149,454 A | 4/1979 | Kemp | |
| 4,254,694 A | 3/1981 | Illy | |
| 4,704,954 A | 11/1987 | Mollenhoff | |
| 4,775,048 A | 10/1988 | Baecchi et al. | |
| 4,797,296 A * | 1/1989 | Meier et al. | 426/433 |
| 4,983,410 A | 1/1991 | Dinos | |
| 5,036,755 A | 8/1991 | Abdenour | |
| 5,108,768 A | 4/1992 | So | |
| 5,167,346 A * | 12/1992 | Bodziak | 221/63 |
| 5,634,394 A * | 6/1997 | Cortese | 99/295 |
| 5,806,409 A | 9/1998 | Johnson et al. | |
| 5,888,392 A | 3/1999 | Frizell | |
| 6,103,116 A | 8/2000 | Koslow et al. | |
| 6,869,627 B2 | 3/2005 | Perkovic et al. | |
| 6,948,420 B2 | 9/2005 | Kirschner et al. | |
| D564,214 S * | 3/2008 | Huang | D3/201 |
| 2004/0118290 A1 | 6/2004 | Cai | |
| 2004/0182247 A1 | 9/2004 | Guerrero | |
| 2006/0032380 A1* | 2/2006 | Klaassen | 99/295 |
| 2009/0050623 A1 | 2/2009 | Nottingham et al. | |

* cited by examiner

Primary Examiner — Reginald L Alexander
(74) Attorney, Agent, or Firm — Husch Blackwell LLP

(57) ABSTRACT

A permanent, resilient filtering pod for brewing beverages which negates the necessity and costs of purchasing filters after each brewed cup provides an enclosed vessel to hold the brewed substance and prevents the brewed substances from spilling over the beverage brewing machine basket or clogging the spray nozzle of the beverage brewing machine yet allows the user to fill the pod with brewing substances purchased in bulk and to control the strength of the beverage brewed.

9 Claims, 1 Drawing Sheet

PERMANENT FILTERING POD FOR BREWING BEVERAGES

CROSS REFERENCE

This invention is the non-provisional patent application claiming the benefit of the earlier filed provisional patent application No. 60/649,493 filed on Feb. 3, 2005 entitled "Permanent filtering pod for brewing beverages". It is further related to the earlier filed provisional patent application No. 60/649,488 filed on Feb. 3, 2005.

BACKGROUND OF THE INVENTION

This invention relates in general to a permeable and permanent filtering pod for brewing beverages which is placed within a basket or bowl for holding the brewing material generally in the field of single cup coffee or tea brewing machine and, more particularly, to a pod that is usefulness in generally brewing one-cup coffee or tea beverages of a predetermined strength wherein the user wants a fresh brewed coffee or tea with every cup of the beverage the user drinks, instead of drinking coffee or tea that has been sitting in a pot on a warmer, or in an insulated coffee carafe.

In the prior art, as shown in U.S. Pat. No. 6,948,420 to Kirschner et al and U.S. Pat. No. 4,254,694 to Illy, show a container for holding ground coffee or tealeaves and a chamber for receiving a disposable pod of compressed coffee with a permanent set of filters that are generally unsuitable in achieving the same results as this invention.

The disposable pods and/or filters disclosed are very limited in the ability to produce a cup of coffee or tea that is brewed to the particular taste of a coffee or tea drinker. In effect, because these disclose pods only holding a specific amount of coffee or tea, and the brewing machines shown only hold a single, sealed and disposable pod, the user has little control over the strength of the coffee brewed. Moreover, the sealed disposable pods are of no use to those persons who like to grind their own coffee beans for a brewed cup of coffee or use their own tea leaves. Also, these disposable pod or filter designs often eventually overflow in some instances and spill the coffee grounds or tea leaves into the single cup that is placed beneath the basket or bowl of the brewing machines.

Also, the disposable pods and/or filtering combinations are extremely expensive when compared to the use of a permanent pod where the user can use bulk ground beans or tea leaves. These disposable pods are again limited in the ability to produce a cup of coffee or tea that is brewed to a particular taste of a coffee or tea drinker because the disposal pods or bags hold only a specific amount of coffee beans or tea leaves and most of single cup brewing machines only hold a single pod or bag so that there is little control over the strength of the coffee or tea brewed.

SUMMARY OF THE INVENTION

A permanent filtering pod for brewing beverages provides an enclosed vessel to hold the brewed material to keep the brewed material from spilling over the beverage brewing machine basket or clogging the spray nozzle of the beverage brewing machine, yet still allows the user to fill the pod with brewing material purchased in bulk, and allows the user to fill the pod with the amount of brewed material desired to control the strength of the beverage brewed.

The permanent filtering pod is generally comprised of one or more different acid and alkali resistant, heat resistant, and wear resistant materials, such as metal, plastic, rubber or fabric. An ideal material for the pod is a surgical steel micro mesh which does not flake or snag and is capable of filtering water there through even using the finest ground material. This surgical steel micro mesh or its equivalent in any of the other above mentioned materials is formed into a pod shape with an opening generally on its top surface for placing brewing materials therein wherein the opening is generally held in a closed and sealed position by two strips defining a generally longitudinal opening having a predetermined length and width when opened, made of a resilient material such as rubber, plastic or even steel. The chosen material for the two longitudinal strips is easily deformable when axial pressure is applied at both ends of the longitudinal strips on the top surface of the pod or squeezed by a thumb and adjacent finger on an end user hand. When the squeezing motion or pressure of the user hand on the two strips is released then the two strips quickly and easily recover their longitudinal shape and close the opening to a definable and sealed slit on top of the pod. Thus the resilient strips supporting the material at the top of the pod forms a seal and that seal can be broken by applying hand pressure to each longitudinal end of the resilient strips on the top surface of the pod, which pressure causes the sealed slit at the top of the pod to open wide. When the pressure at the ends of the resilient strips is released, the pod closes and seals the opening.

Yet another pod in keeping with the invention is a permanent filtering pod formed of a single one of any resilient, non-corrosive, heat and wear resistant materials above-mentioned. This single material pod is easily deformable when hand pressure is applied thereto, and which single material pod quickly and easily recovers its shape when said pressure is released. The material for the pod is chosen so finely perforated to form an enclosure through which liquids can pass, but through which the brewed material of choice can not pass. The pod material is formed or folded in a manner to form a thin and sealable slit of a predetermined length along the top of the pod. The slit on the pods opens wide when pressure is applied to each end of the slit. When the slit is open by applying the pressure, a material to be brewed can be scooped into the open pod and stored therein within its cavity of a predetermined size. When the pressure against the slits opposing ends is released, the slit will close in a sealing relationship as the pod recovers its original shape.

A further embodiment of the present invention is a filtering pod formed of a combination of two or more of the above mentioned materials. The deformable pod having a frame formed of one resilient, non-corrosive, heat resistant material which material is easily deformable when pressure is applied to the resilient material. This frame material quickly and easily recovers its shape when said pressure is released. Next, a second and supporting other non-corrosive, heat resistant mesh or finely perforated resilient or generally non-resilient material forms a pod which liquid could pass, but through which the brewed material can not pass. The frame of the pod includes a sealable slit on the top surface of the pod. The slit opens when pressure is applied to the frame at each end of the slit, allowing the user to scoop brewing material into the cavity of the pod when the slit is open wide and then upon release of said pressure, the slit will sealably close preventing the brewing material from spilling over into the cup or retaining vessel below the pod receiving the liquid from the brewing machine It is a principal object of the present invention to provide a permanent filtering pod for brewing beverages which allows the user to select a brewing material to be placed into the cavity of the pod with a predetermined amount of said material to regulate the strength of the brewed beverage.

It is another object of the invention to provide a permanent filtering pod for brewing beverages that replaces disposable pods that limits the amount and type of the selected brewing material and permits the end user to decide the amount and type of brewing materials to be used in brewing the end beverage.

Accordingly, it is yet another object of the present invention to provide a permanent filtering pod having an opening of a predetermined size for inserting the brewing material into the cavity formed by said pod when pressure is applied to the sides of the pod deforming the same and then sealing the opening when pressure is released from the pod sides and the pod returns to its original configuration with the opening sealably closed It is still a further object of the present invention to provide a deformable and permeable filtering pod having a cavity accessible by applying pressure to the sides of the pod which causes a slit on its top surface to open wide for receiving a brewing material into said cavity and then when the pressure is released opening in the slit is sealed so that water can pass through the permeable material of the pod to brew a beverage of choice.

It is a another object of the invention to provide a filtering and permeable pod consisting of one deformable material as the frame and a second resilient or non-resilient material as the body of the pod in which the frame on the top surface of the pod includes a sealable slit therein which opens to insert brewing material into the inside of the pod when pressure is applied to its ends and then sealably closes when pressure is released for brewing purposes.

Yet another object of the invention is to provide a permanent, deformable filtering pod of a single resilient, non-corrosive, heat and wear resistant material including a longitudinal slit forming an opening into the inside of the pod when pressure is applied at each end of the slit to insert the brewing material and then sealably closing when the pressure is released for brewing purposes.

Still it is a further object of the invention to provide a permanent filtering and deformable pod of acid and alkali resistant, heat and wear resistant materials, such as metal, plastic rubber or fabric that is permeable to pass liquids there through which includes two longitudinal strips sealably adjacent each other along the top surface of the pod which form an opening there through into the cavity of the pod when pressure is applied to the ends of the strips but then close in their sealable relationship when pressure at the ends are released so that brewing material can be placed inside the cavity for brewing and then sealed against spilling over into the container catching the brewed liquid beverage.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention, which is not necessarily represented by any one embodiment.

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
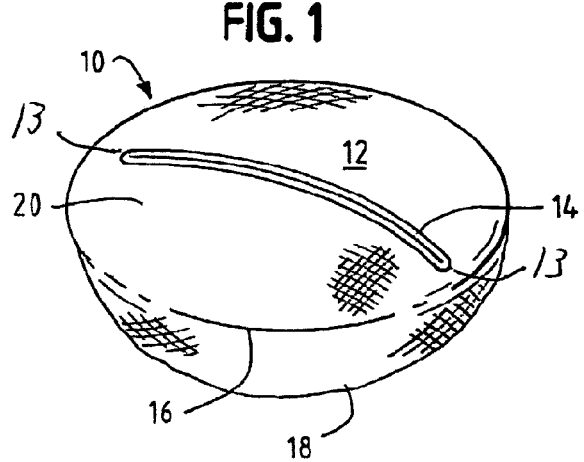
FIG. 1 shows an overall perspective view of a permanent filtering pod incorporating the basic components in accordance with the present invention.

Referring now to the drawings and especially to FIG. 1 shows a permeable, permanent filtering pod 10 for brewing beverages like coffee or tea from beans or leaves, respectively. The pod 10 is made from a generally permeable and deformable material 12 comprised of several different acids and alkali resistant, heat and wear resistant, resilient and deformable materials, such as metal, plastic, rubber or fabric. A desirable permeable but deformable material is a surgical steel micro mesh, which has the properties of being flake or snag resistant but yet filters the brewing liquid, generally water, to pass through even the finest ground brewable substances such as fresh ground coffee beans or fine tea leaves captured within the pod. The pod 10 includes a longitudinal and sealable slit 14 terminating in generally rounded corners 13 at each end thereof. The slit 14 in FIG. 1 is shown in its sealed configuration which prevents brewable substances within the pod 10 from overflowing into the brewed beverage cup. The slit 14 runs in a partial diameter across the top of the pod 10 encompassed by a generally circular or annular rim 16 of a predetermined shape. In FIG. 1, the pod 10 is shown in a first non-deformable configuration state of the pod whereby the rim 16 is in a generally circular shape that divides a bottom portion 18 from a top surface 20 on the pod 10.

Figure 2:
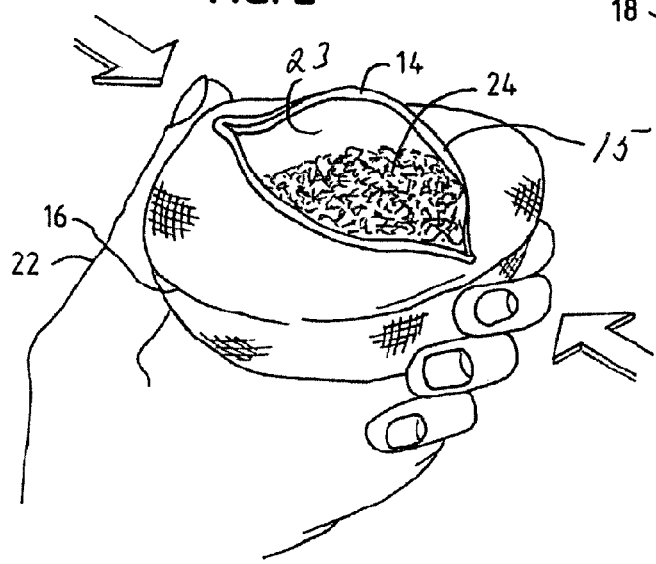
FIG. 2 is a perspective view showing the method of applying pressure to the pod for creating an opening on its top for inserting brewing materials a configuration of a particularly preferred embodiment of the invention of FIG. 1.
Figure 5:
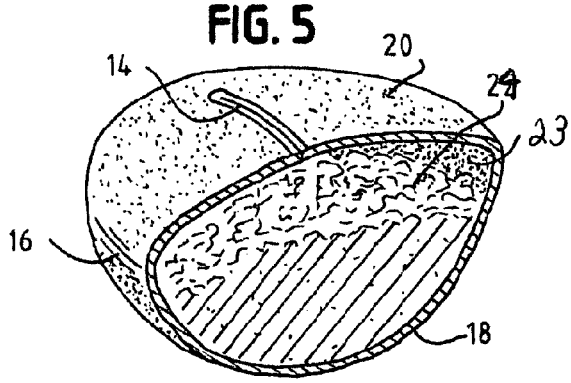
FIG. 5 is taken along cross section lines 4-4 of FIG. 3 showing a single permeable material in accordance with the invention of FIG. 1.
Figure 4:
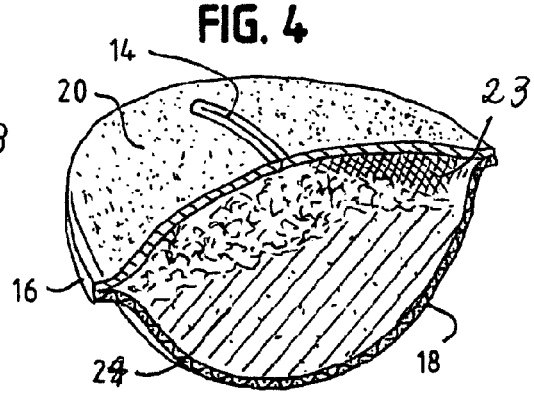
FIG. 4 is taken along cross section lines 4-4 of FIG. 3 showing two different permeable materials in accordance with the invention of FIG. 1.

FIG. 2 shows that the pod material 12 forms a cavity 23 as further depicted in FIGS. 4 and 5 for holding a pre-selected amount of a brewable substance 24. The sealable slit 14 is easily deformed to form a wide opening 15 for scooping or inserting the brewable substance 24 into the cavity 23 of the pod 10 in a second deformable configuration state. A user simply applies finger pressure to the rim 16 on each side of the deformable pod 10 closely adjacent the opposing and rounded ends 13 of the slit 14. When the finger pressure of the hand 22 is released on the rim 16 or on the opposing sides of the pod 10 then the pod 10 returns to its original first configuration state as shown in FIG. 1. In the first configuration state of the pod 10, the slit 14 seals the brewing substance 24 within the cavity 23 of the pod 10 and is now ready for brewing by passing a hot liquid through the permeable material of the pod 10 now inserted into the stream of the hot liquid flow for a single coffee maker of the drip type wherein the water is heated to discharge into a single cup or container below the bottom portion 18 of the pod 10.

Figure 3:
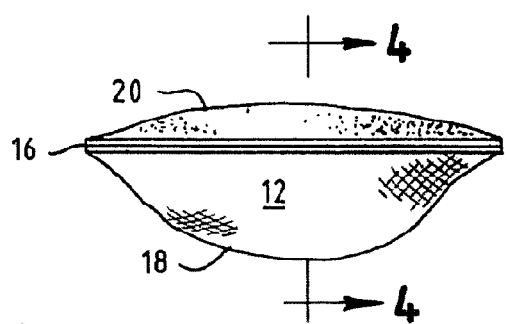
FIG. 3 is a side view perspective in accordance with the present invention of FIG. 1.

FIG. 3 shows a side view of the pod 10 where the top surface 20 is slightly concave and the bottom portion 18 forms a general bowl shape for dripping the water into the single cup located below the bottom portion 18 of the pod 10. The material 12 of the pod 10 is either made from all of the same permeable and resilient material or the rim 16, bottom 18 and top surface 20 of the pod are all made of different permeable, resilient and resistant materials 12 from the general list of the types of materials suitable for the pod 10 construction as mentioned above. In FIG. 3, the rim 16 is clearly defined and generally projects outwardly from the surface of the pod 10 to rests on a lip on the bottom of a coffeemaker basket or to frictionally engage and rest on an inner side of a conical shaped basket or bowl with a cutout at its bottom for passing brewing liquid below the water dispensing portion of the coffeemaker.

FIG. 4. shows a cross section of the pod 10 taken along the lines 4-4 of FIG. 3 in which the slit 14, top surface 20, rim 16 and bottom portion 18 of the pod 10 are all made of different permeable and deformable materials holding the brewing substance 24 therein. The pod 10 in FIG. 4 operates and functions in the same manner as described above in FIG. 2. but shows the pod in its first configuration state whereby the slit 14 acts as a sealed opening to the cavity 23 of the pod 10. Depending upon the desires, the permeable and resistant material of the bottom 18 may be either resilient or generally non-resilient. The top surface 20 is generally made of a resilient material 12 and the slit 14 may be of the same material or the second resilient material. The rim 16 would generally be made of a resilient and deformable material so that squeezing the opposing locations on the generally circular rim 16 with minor finger pressure would easily deform the slit 14 to provide a wide opening 15 into the pod cavity 23 for inserting the brewing substance 24 such as freshly ground coffee beans or tea leaves.

FIG. 5 shows another cross section of the pod 10 taken along the lines 4-4 of FIG. 3, in which the pod 10 comprises a single resilient and permeable material for the slit 14, annular rim 16, bottom 18 and top surface 20 that operates and functions as first described above for FIG. 2. Again the brewing substances 24 of ground coffee beans or tea leaves are completely sealed within the cavity 23 of the pod 10 when in its original configurations and the slit 14 has two opposing sides and extending in a predetermined longitudinal direction across a predetermined portion of the pod diameter. The slit 14 may be considered to be comprised of two opposing strips 14 joined at their ends 13 to provide a wide, deformable opening when finger pressure is applied on opposing sides of the rim 16 or against the opposing sides on the pod surface in the same longitudinal axis of the opposing strips 14 or essentially at both ends of the strips 14 creating the wide opening 15 between the strips 14 and then the strips 14 closing together upon the release of the finger pressure at opposing sides of the rim 16

Having described and illustrated the principles of the invention in a preferred embodiment thereof, it should be apparent that the invention can be modified in arrangement and detail without departing from the spirit and scope of the invention as claimed.

We claim:

1. A method for inserting brewing substances within a permeable, deformable and permanent filtering pod for brewing beverages, comprising: applying finger pressure to opposing sides of the deformable pod; deforming a sealed slit on the top surface of the pod to create an opening in the slit into a cavity within the pod; inserting a pre-selected amount of brewing substance into the cavity of the pod through the opened slit to vary the strength of the brew beverage to meet a particular desired taste level for the brewed beverage; releasing the finger pressure on the opposing sides of the deformable pod thereby returning to the pod to its non-deformed state so that the slit seals the opening into the cavity of the pod making the pod ready for brewing the beverage; wherein the pod includes an annular pod rim around the circumference of the pod, placing the pod rim on top of an inner rim of a brewing basket and generally horizontally disposed on the bottom portion of the basket on a brewer machine to hold the pod in place during the brewing process and passing a hot liquid through the sealed pod with the brewing substances therein to make the brewed beverage.

2. The method of claim 1, wherein the pod is made from a generally an acid, alkali, heat and wear resistant, resilient plastic, metal, rubber or fabric for normal use.

3. The method of claim 2 wherein the deforming slit forming the opening into the cavity of the pod is made of similar material as the pod.

4. The method of claim 1, wherein the annular rim of the pod is easily deformed when applying finger pressure to open the slit and is also deformable to feed the pod through the bottom opening of the brewing machine basket to then rest on the inner rim of the basket to allow hot liquid to flow through the permeable pod in a cup or container beneath the pod.

5. The method of claim 1, wherein the pod includes a rim generally annular around the circumference and integral with the sides, the pod having the slit disposed generally on the top of the pod.

6. The method of claim 1, wherein the applying of the pod to a drip single-cup coffee brewer further comprise the steps of: taking the pod within the user hands; deforming the pod by applying finger pressure to its circumference; inserting the pod into the opening in the bottom of a basket on the coffee brewer; releasing the finger pressure on the pod to have the pod return to its normal non-deformed configuration so that the pod is securely resting in surface contact within the basket of the coffee brewer; dripping a hot liquid through the pod to reach the desire level of the beverage in a cup located below the pod.

7. The method of claim 1, wherein the pod slit includes a pair of strips located on the top of the pod and extending longitudinally across the top a predetermined distance and joined at their ends to form an opening when deformed by finger pressure applied at the opposing ends of the strips.

8. A method for inserting brewing substances within a permeable, deformable and permanent filtering pod for brewing beverages for use in a basket of a coffee brewer, comprising:

applying finger pressure to opposing sides of the deformable pod;

deforming a sealed slit on the top surface of the pod to create an opening in the slit into a cavity within the pod by applying finger pressure to its circumference;

inserting a preselected amount of brewing substance into the cavity of the pod through the opened slit to vary the strength of the brew beverage to meet a particular desired taste level for the brewed beverage;

wherein the slit seals the opening into the cavity of the pod so that the pod is securely within the basket of the coffee brewer making the pod ready for brewing the beverage;

releasing the finger pressure on the pod to have the pod return to its normal non-deformed configuration so that the pod is securely resting in surface contact within the basket of the coffee brewer;

dripping a hot liquid through the pod to brew to reach the desire level of the beverage in a cup located below the pod and dripping a hot liquid through the sealed pod with the brewing substances therein to make the brewed beverage.

9. A method for inserting brewing substances within a permeable, deformable and permanent filtering pod for brewing beverages for use in a basket of a brewing machine, comprising:

applying finger pressure to opposing sides of the deformable pod;

deforming a sealed slit on the top surface of the pod to create an opening in the slit into a cavity within the pod and feeding the pod through a bottom opening of the brewing machine basket to then rest on the inner rim of the basket to allow hot liquid to flow through the permeable pod in a cup or container beneath the pod;

inserting a pre-selected amount of brewing substance into the cavity of the pod through the opened slit to vary the strength of the brew beverage to meet a particular desired taste level for the brewed beverage;

releasing the finger pressure on the opposing sides of the deformable pod thereby returning to the pod to its non-deformed state so that the slit seals the opening into the cavity of the pod making the pod ready for brewing the beverage; and passing a hot liquid through the sealed pod with the brewing substances therein to make the brewed beverage.

* * * * *